United States Patent
Katz et al.

(10) Patent No.: US 6,456,905 B2
(45) Date of Patent: Sep. 24, 2002

(54) METHOD AND APPARATUS FOR LIMITING ATTITUDE DRIFT DURING TURNS

(75) Inventors: Kenneth P. Katz, Overland Park; James J. Lehfeldt; Joseph M. Oberg, both of Olathe; William G. Sample, Paola; Ronald D. Wilson, Olathe, all of KS (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 09/746,128

(22) Filed: Dec. 22, 2000

Related U.S. Application Data

(60) Provisional application No. 60/206,966, filed on May 25, 2000, provisional application No. 60/171,721, filed on Dec. 22, 1999, and provisional application No. 60/212,114, filed on Jun. 16, 2000.

(51) Int. Cl.[7] .................................. G06F 1/00
(52) U.S. Cl. ........................... 701/4; 244/3.21
(58) Field of Search ................ 701/4, 5, 6, 7, 701/8, 9, 10, 11; 244/3.21, 165

(56) References Cited

U.S. PATENT DOCUMENTS

| | | | |
|---|---|---|---|
| 3,937,423 A | * 2/1976 | Johansen | 244/3.22 |
| 3,984,748 A |   10/1976 | Sullivan | 318/648 |
| 4,914,598 A | * 4/1990 | Krogmann et al. | 701/11 |
| 5,023,796 A |   6/1991 | Kahler | 364/434 |
| 5,263,662 A | * 11/1993 | Fowler et al. | 244/17.13 |
| 5,897,223 A | * 4/1999 | Tritchew et al. | 396/13 |

OTHER PUBLICATIONS

Helfrick, *Modern Aviation Electronics*, 2d ed., Prentice Hall Career and Technology, Englewood Cliffs, NJ, 1994, Chap. 7, "Indicators," pp. 313–347.

Helfrick, *Modern Aviation Electronics*, 2d ed., Prentice Hall Career and Technology, Englewood Cliffs, NJ, 1994, Chap. 8, "Flight Control Systems," pp. 348–358.

McLean, *Automatic Flight Control Systems*, Prentice Hall Inc., Englewood Cliffs, NJ, 1990, pp. 73–97.

\* cited by examiner

*Primary Examiner*—Richard M. Camby

(57) ABSTRACT

An apparatus, method and computer program product useful for supplying the pilot of an aircraft with aircraft attitude information. During bank angles exceeding a predefined limit, the roll gyro is slaved to a roll angle estimator for improved system accuracy.

12 Claims, 9 Drawing Sheets

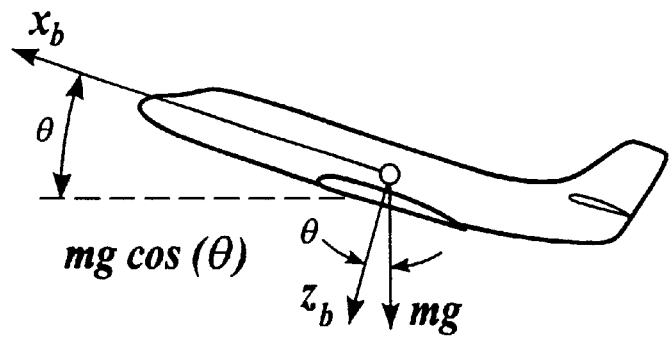
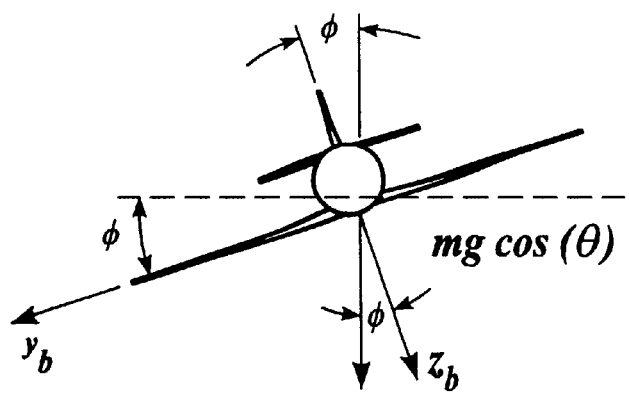
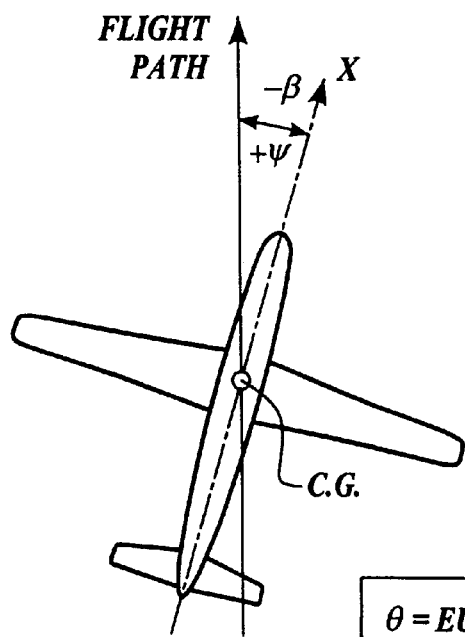
θ = EULER PITCH ANGLE
φ = EULER ROLL ANGLE
Ψ = EULER HEADING ANGLE
*Fig. 2*

TURN COORDINATOR

HEADING INDICATOR

ATTITUDE INDICATOR

AIRSPEED INDICATOR

ALTIMETER

VSI

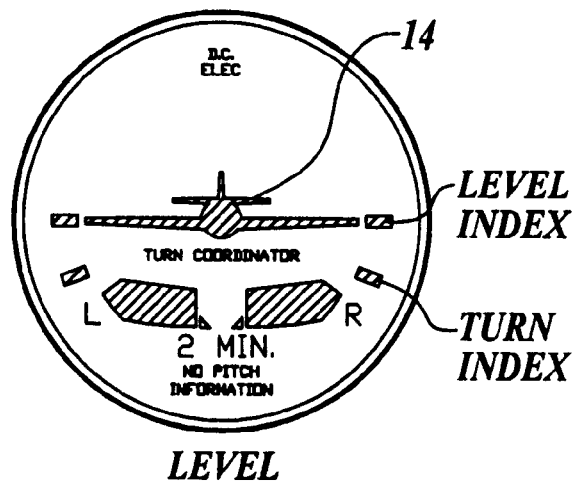
Fig. 4A *(PRIOR ART)*
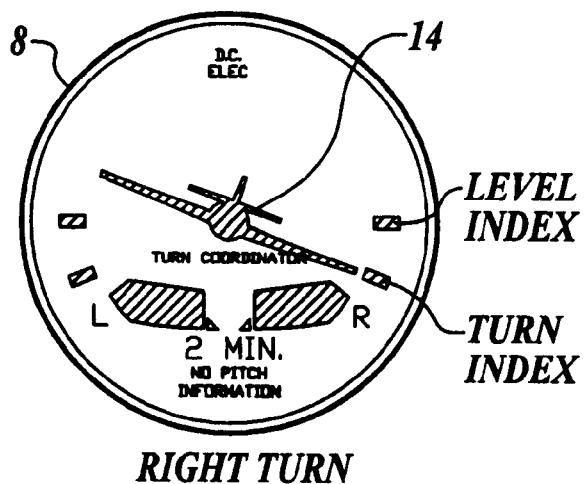
Fig. 4B *(PRIOR ART)*

METHOD AND APPARATUS FOR LIMITING ATTITUDE DRIFT DURING TURNS

CROSS-REFERENCES TO RELATED APPLICATIONS

This application claims priority from U.S. application Ser. No. 60/206,966 titled "Technique for Estimating Aircraft Heading with Reduced Sensor Set," filed May 25, 2000; and from U.S. application Ser. No. 60/171,721 titled "Method and Apparatus for Estimating Airplane Attitude with Reduced Sensor Set," filed Dec. 22, 1999; and from U.S. application Ser. No. 60/212,114 titled "Technique for Limiting Roll Attitude Drift During Turns in AHRS Applications," filed Jun. 16, 2000, the entire specifications of each which are herein incorporated by reference.

BACKGROUND OF THE INVENTION

This application relates to aircraft control systems and more particularly to aircraft sensor systems.

An aircraft is a vessel that is free to move in three dimensional space. FIG. 1 depicts a typical coordinate system useful for describing aircraft motion in three dimensions. In the body fixed coordinate system of FIG. 1, the aircraft has a longitudinal axis $x_b$ which extends along the length of the airplane. Rotation about the $x_b$ axis, L, is called roll. The coordinate system of FIG. 1 further includes a lateral axis $y_b$ extending parallel to the aircraft wing. Rotation about the $y_b$ axis, M, is called pitch. The $z_b$ axis extends perpendicular to the remaining axes as shown. Rotation about the $z_b$ axis N, is called yaw.

Equations of motion can be derived to describe the aircraft movement using the axes shown in FIG. 1. Unfortunately, the orientation and position of the aircraft in space cannot be truly understood with the coordinate system of FIG. 1 since the coordinate system is moving with and is always centered on the body of the aircraft. For this reason, it is common to transform the parameters of FIG. 1 to describe the angular displacement of the aircraft in space. These angular displacements, or Euler angles, are as shown in FIG. 2.

In good weather, under visual flight conditions, pilots of conventional aircraft control the aircraft motions and the resulting angular displacements in three dimensional space by visual reference to the natural horizon. The natural horizon serves as a visual clue from which the pilot can determine if the airplane is climbing, descending or turning. In low visibility conditions, such as, for example: nighttime, haz, or flight in clouds; the natural horizon can become obscured and the pilot is unable to control the aircraft by reference to the natural horizon. Conventional aircraft are therefore equipped with several instruments to assist the pilot in visualizing the aircraft's movement in three dimensional space. These instruments also provide the pilot with supporting data from which to confirm control the aircraft even when the natural horizon is visible.

FIGS. 3A–3G show a conventional aircraft panel for a contemporary airplane having such standard instrumentation. The control panel of FIG. 3A includes: an altimeter 2 that provides the pilot with information on aircraft altitude; an airspeed indicator 4, that provides information on the aircraft speed through the air; and a vertical speed indicator 6, that provides data on the rate of climb and descent. Instruments 2, 4 and 6 comprise the pitot-static, or pneumatic, instruments since they operate by sensing air pressures exterior to the aircraft. In certain larger aircraft, the pitot static instrument sensors are combined into a single box called an air data computer. The air data computer then outputs the altimetry and airspeed data to a cockpit display and/or to other avionics equipment requiring such data.

Also included in the standard control panel of FIG. 3A are the gyroscopic instruments. The gyroscopic instruments provide the pilot with a pictorial view of the airplane's rate of turn, attitude and heading. These instruments include a turn coordinator 8, an attitude indicator 10, and a heading indicator 12. A wet magnetic compass 13, may also be used to provide heading information. Wet compass 13 does not contain a gyro.

FIGS. 4A–4B illustrate aircraft turn coordinator 8 in greater detail. Turn coordinator 8 senses yaw, r, and roll, p, movement about the aircraft $z_b$ and $x_b$ axes. When the miniature airplane 14 is level as shown in FIG. 4A, the aircraft is neither turning nor rolling. When the aircraft banks, miniature airplane 14 also banks. In the drawing of FIG. 4B, miniature airplane 14 indicates a turn to the right.

FIGS. 5A–5D illustrate operation of aircraft attitude indicator 10 also known as an artificial horizon. Attitude indicator 10 senses pitching, $\Theta$, and rolling, $\phi$, movements about the airplane's lateral and longitudinal axes. Attitude indicator 10 is the only flight instrument that provides both pitch and bank information to the pilot. Attitude indicator 10 presents a view of the aircraft, as represented by miniature airplane 20, as the aircraft would appear to someone standing behind it. The pitch attitude of the aircraft is shown by noting the position of the nose 22 of miniature airplane 20 relative to the artificial horizon 24. Bank information is shown both by noting the position of miniature airplane 20 relative to the deflected artificial horizon 24 and by the alignment of bank angle pointer 28 with the graduated bank angle indexes located on the perimeter of the device. FIG. 5A shows the aircraft in level flight and no turn. FIG. 5B shows the aircraft in a level turn to the left. FIG. 5C shows a level climb and FIG. 5D shows a descending left turn.

Heading indicator 12, also known as a directional gyro, serves as a means to indicate the aircraft magnetic heading without the limitations of using wet compass 13. Wet compass 13 is prone to various turning and acceleration errors. Heading indicator 12 is not subject to these errors and thus provides the pilot with a more stable indication of aircraft heading throughout the flight.

Each of turn coordinator 8, attitude indicator 10, and heading indicator 12 includes a gyroscope needed for proper operation of these instruments. Typically, the gyroscopes in attitude indicator 10 and heading indicator 12 are powered by a vacuum pump. Turn coordinator 8 is normally powered using an electric motor. The gyroscopes contained within each of these instruments also have operating limitations. For example, if the aircraft enters an extreme or unusual flight attitude, the gyroscope can tumble rendering the associated instrument inoperative.

Similar to the air data computer, the gyroscopic instruments are occasionally on larger aircraft combined into a single integrated sensor package called an attitude heading reference system, or AHRS. The AHRS system outputs the attitude data to a cockpit display and to other avionics equipment requiring such data.

In airplanes with autopilots, the autopilot uses the attitude information supplied by these gyroscopic instruments or AHRS instrument suite to fly the aircraft. Thus, when an instrumentation fault occurs, the autopilot is also affected.

Gyroscopic instruments are also prone to various types of errors during normal operations. FIG. 6 is a cut away view of a gyroscope and gimbal structure representative of those used in aircraft applications such as directional gyro 12. The gyroscope of FIG. 6 includes gyro wheel 30 mounted on an inner gimbal 36 which is in turn mounted on an outer gimbal 37. Directional gyro 12 and the heading gyro used in AHRS applications work best when the inner gimbal is exactly perpendicular to the outer gimbal. When the inner gimbal is correctly oriented, the gyro is said to be 'erect.' When the gyro is not erect, its output is inaccurate.

Modern gyros use an automatic erection system to maintain the gimbals in the proper orientation. In one such system, an inclinometer, in the form of a pendulum or an accelerometer is used. FIGS. 7A and 7B show a pendulum erection system used with vacuum driven gyros. In FIG. 7A, the pendulum 40 hangs in a first orientation when the gimbals are properly aligned. In FIG. 7B, pendulum 40 is displaced when the gimbals are not properly aligned, opening air vents 42 which then cause the gyro to move to the desired position under the force of the resulting air flow.

Accelerometer based systems work identical to the pendulum based systems. Both systems are sensitive to the acceleration of gravity and actual aircraft accelerations. Under steady state conditions, or with no aircraft accelerations, both (accelerometer and pendulum) will sense a proper vertical position or "locally level" direction.

In some circumstances, the pendulum may cause opening of the air vents even though the gyro gimbals are correctly aligned. This condition can occur when the aircraft is in a steady state turn and the resultant gravity vector is now displaced to one side as shown in FIG. 8. The result is that the erection system will erroneously be activated causing the gyro to erect on a false vertical with correspondingly inaccurate output.

To counteract this problem, during turns greater than 6 degrees, the AIRS system deactivates the automatic erection system. This sends the gyro into a free drift mode during the turn. When the turn is completed, the angle measured using the gyro will have some small error. However, it is usually assumed that any resulting errors are small.

SUMMARY OF THE INVENTION

The present invention recognizes the problems associated with gyro cut out circuits used to prevent the gyro from erecting into a false vertical. According to one aspect of the present invention, a roll angle estimate based on existing aircraft yaw rate and true airspeed is used to slave the Euler roll attitude computation during periods when the bank angle causes the automatic erection system to place the gyro in free drift mode. In this manner, the system providing heading data to the pilot is supplied supplemental sensor data thereby reducing errors.

According to another aspect of the invention, the roll angle estimate may be output from a separate system used to provide roll angle, pitch angle and/or heading angle estimates when the primary AHRS or aircraft gyro system has a fault or failure. In such an embodiment, the invention includes a signal processing device further including logic, either software and/or hardware, for estimating aircraft roll angles, pitch angles and heading angles. Each angle estimator is coupled to a suite of sensors from which the desired angle may be estimated in the absence of sensor data directly measuring that angle. The sensors may be integrated with the present invention or located separately onboard the aircraft. Optionally, the roll angle estimator may be included integrally with the present invention.

Further details and operation of the invention are described below.

BRIEF DESCRIPTION OF THE DRAWINGS

FIG. 2 is an illustration of Euler angles useful for understanding aircraft motion and nomenclature used in the description of the present invention;

FIGS. 4A and 4B are illustrations depicting operation of an aircraft turn coordinator;

DESCRIPTION OF THE SPECIFIC EMBODIMENTS

Figure 1:
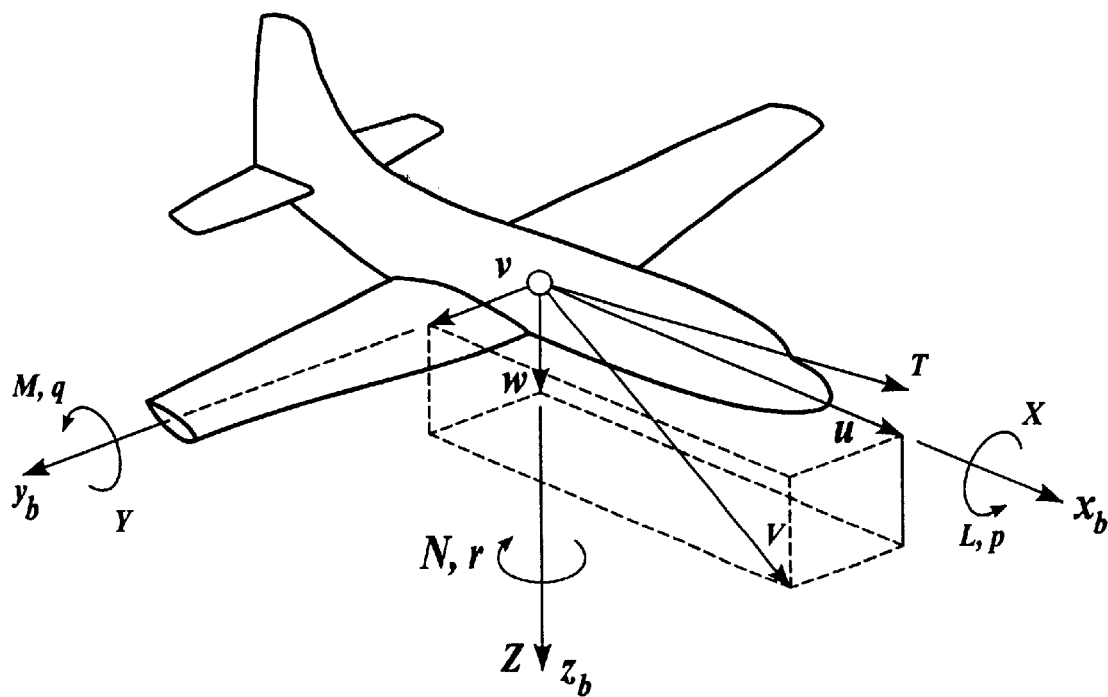
FIG. 1 is an aircraft coordinate system useful understanding the present invention.
Figure 3A:
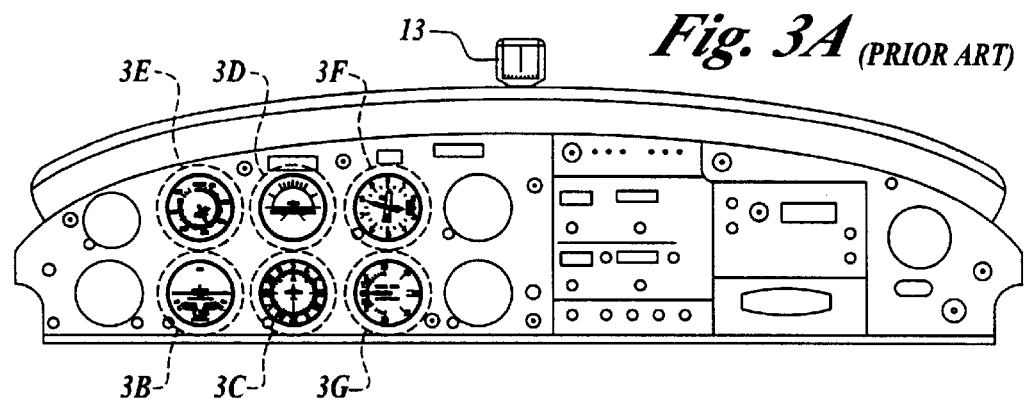
FIGS. 3A–3G are illustrations of a conventional aircraft instrument panel and associated instruments.
Figure 3B:
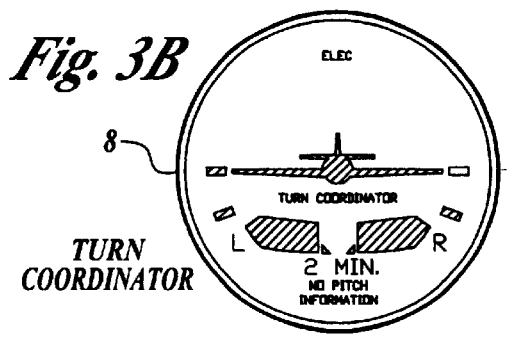
Figure 3C:
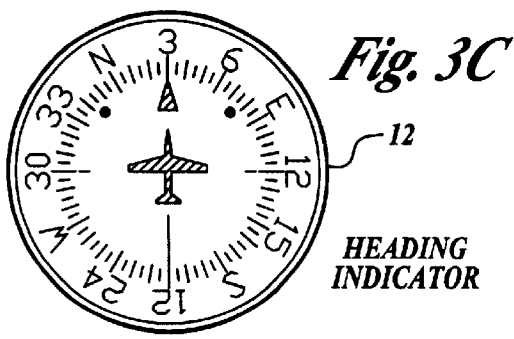
Figure 3D:
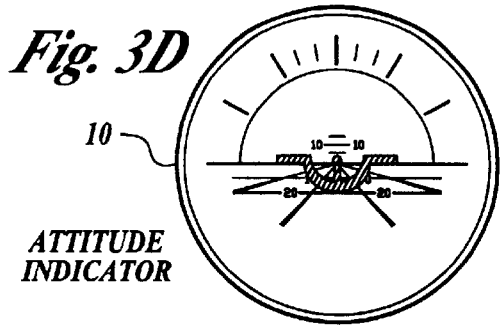
Figure 3E:
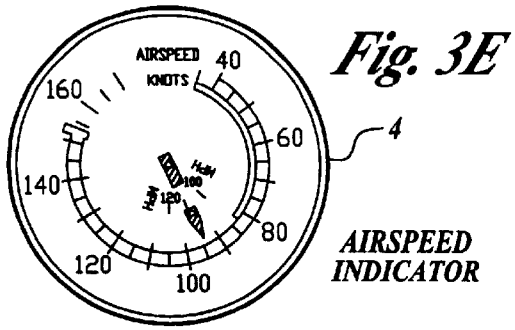
Figure 3F:
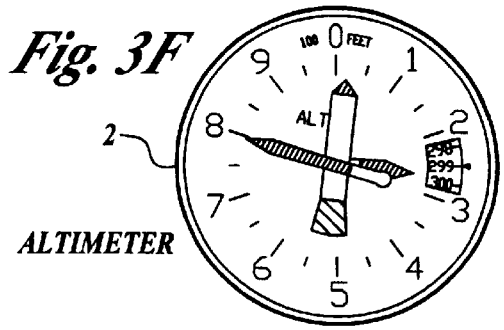
Figure 3G:
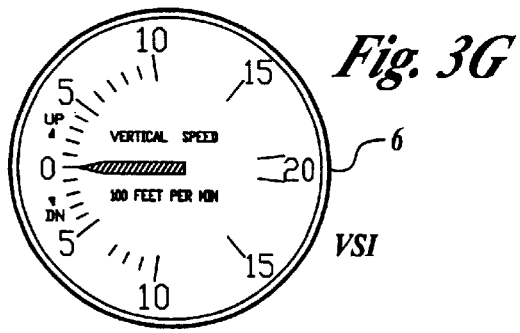
Figure 5A:
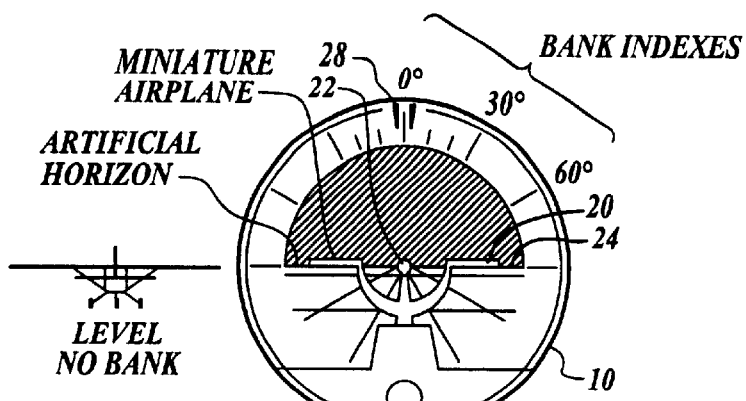
FIGS. 5A–5D are illustrations depicting operation of an aircraft attitude indicator.
Figure 5B:
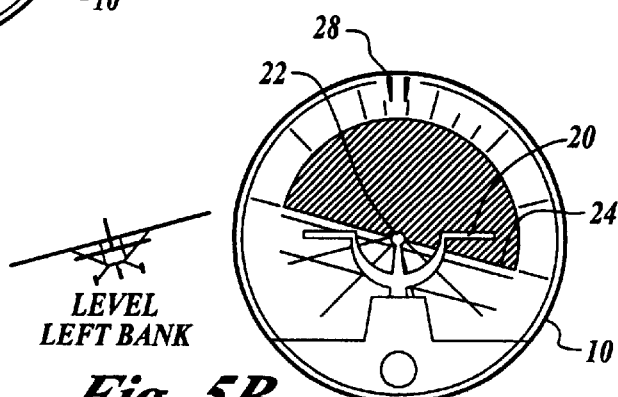
Figure 5C:
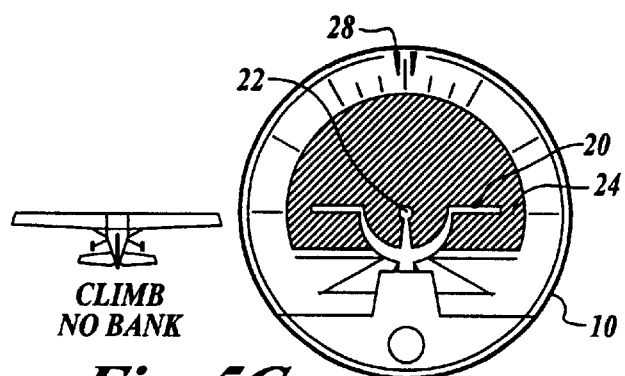
Figure 5D:
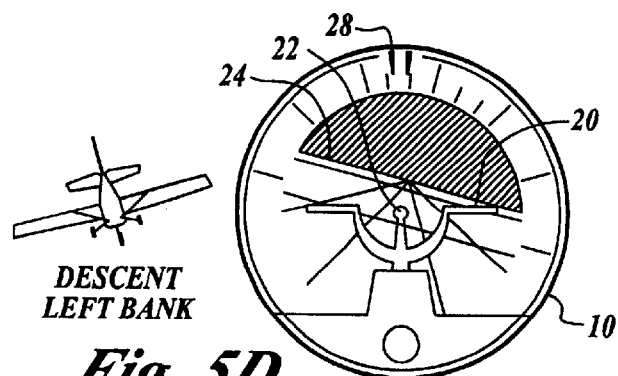
Figure 6:
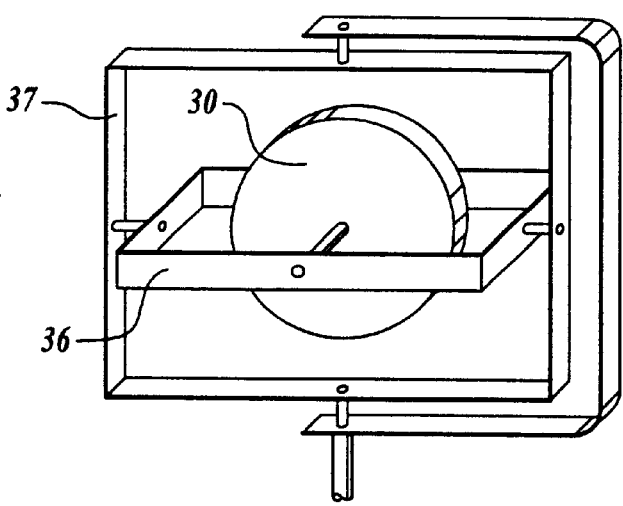
FIG. 6 illustrates a gyroscope/gimbal construction typically used in aviation applications.
Figure 7A:
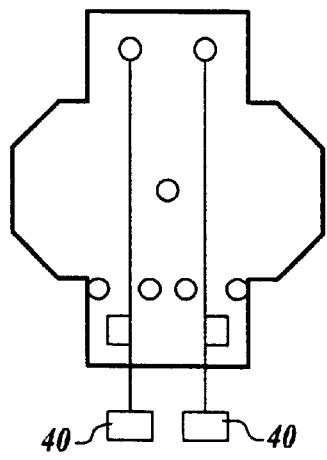
FIGS. 7A–7B illustrate one type of automatic gyro erection system known to those of skill in the art.
Figure 7B:
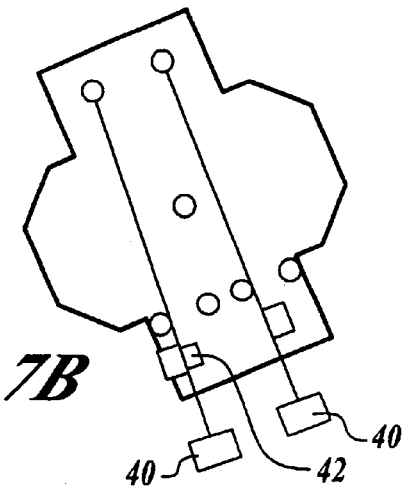
Figure 8:
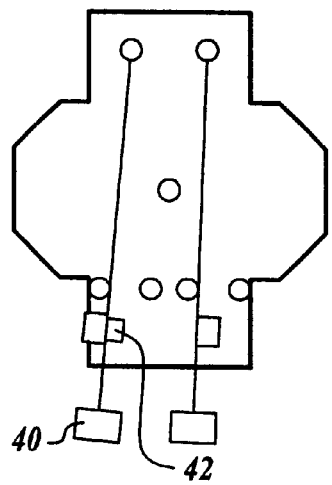
FIG. 8 illustrates a condition which results in the gyroscope erecting into a false vertical.
Figure 9:
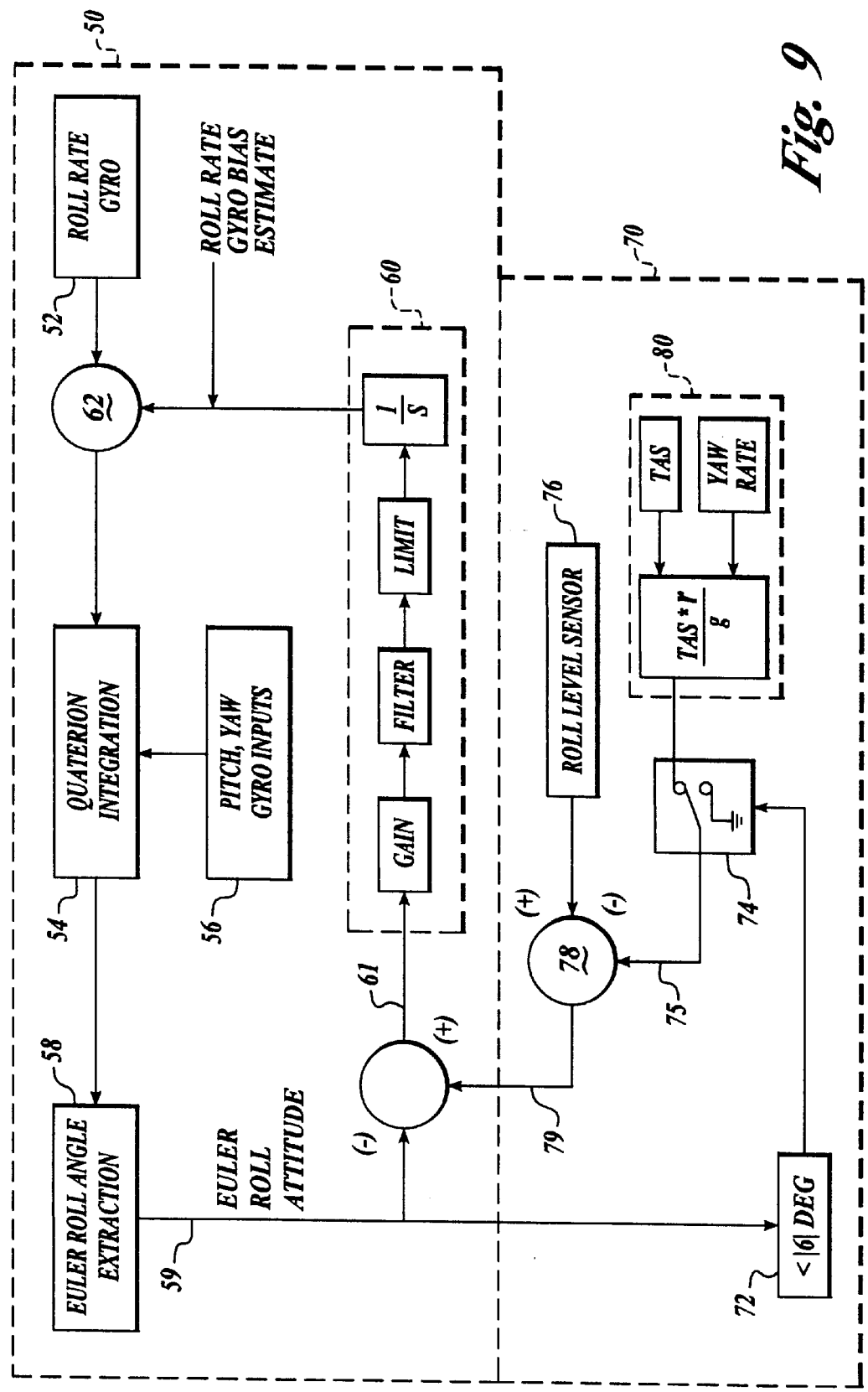
FIG. 9 is a block diagram of a device useful for limiting roll angle drift according to a preferred embodiment of the present invention.

FIG. 9 contains a block diagram of a system for limiting roll attitude drift constructed according to a preferred embodiment of the present invention. The diagram of FIG. 9 includes a feedback control loop 50 of the type typically found in AHRS units for obtaining roll angle data. Feedback control loop 50 receives data from body axis roll rate gyro 52 and then integrates this input at integrator block 54 in conjunction with the other two body axis rate gyros: pitch rate, q, and yaw rate, r. The integrated output from the Quaternion integration contains the three Euler angle data but in Quaternion form. Process block 58 used to extract the Euler roll angle is well known to those of ordinary skill in the art.

Feedback and control loop 50 additionally includes a first error correction circuit, or a slaving circuit, 60 used to estimate the bias error of the roll rate gyro instrument. The design and construction of slaving circuit 60 is well known to those of ordinary skill in the art and many variations are possible. The operation of circuit 60 will be explained in greater detail below. The bias error signal output is then summed with the rate gyro input at summing junction 62 to obtain a bias corrected roll rate input to integrator 54. The output of circuit 50 is an Euler roll angle that is provided to the AHRS cockpit display and to other systems requiring a roll angle input.

According to a preferred embodiment of the present invention, the block diagram of FIG. 9 additionally includes a second error correction, or drift angle minimization circuit 70. The Euler roll angle of feedback loop 50 is provided to a comparator 72. Comparator 72 compares the absolute value of the calculated roll angle with a predefined limit beyond which the gyro is at risk of erecting into a false vertical position. This limit value is nominally set at 6 degrees but other values may be used as appropriate. Comparator 72 may be constructed as a digital circuit according to techniques well known to those of skill in the art. Other mechanizations are also well known to those of skill in the art and the particular mechanization of comparator 72 is not of significance. The output of comparator 72 is coupled to a switch 74. So long as the roll angle remains below the predefined limit, switch 74 remains coupled to ground and the roll drift correction signal on line 75 is deasserted.

Drift angle minimization circuit 70 additionally includes a roll level sensor 76. Roll level sensor 76 is used to initialize the gyro and to detect drift angle errors. For example, if the airplane were originally parked on a nonlevel surface, some nonzero roll angle might be sensed even though the aircraft is not technically in a bank. Similarly, if the wings are in a near level condition, roll level sensor detects this condition and supplies an output useful for adjusting for drift of the rate angle gyro. Level sensor 76 thus operates in conjunction with error circuit 60 to eliminate errors due to such conditions.

The output of roll level sensor 76 and switch 74 is summed at junction 78 to obtain a drift correction signal on line 79. The drift correction signal is added to the roll angle signal output 59 from process 58 to obtain a difference signal which is input to slaving circuit 60. Thus, for the system as shown in FIG. 9, when the calculated roll angle is less than 6 degrees, the output of switch 74 is coupled to ground. For a coordinated bank angle turn, the output of roll level signal 76 is also a null value and therefore signal 79 output from summing junction 78 is deasserted. Thus, for a hypothetical bank angle of 5 degrees, the signal on line 79 would be zero, or deasserted. The signal on line 59 is a signal indicative of 5 degrees of bank and the apparent drift angle error signal appearing on line 61 indicates an error of 5 degrees. This error signal is processed by slaving circuit 60 which continues to run until the error is driven back to zero by feedback loop 50.

If the bank angle exceeds the threshold of comparator 72, then switch 74 is toggled to couple the output of roll angle estimation circuit 80 to line 75. Roll angle estimation 80 is described in greater detail below. The roll estimate signal appearing on line 75, is added to the roll level sensor 76 output; which will normally be zero, or deasserted, for a coordinated turn. Thus, the roll angle estimate is added to the Euler roll angle appearing on line 59 to obtain the error signal on line 61 input to slaving circuit 60.

The embodiment of FIG. 9 indicates that both block 76 and block 80 may be active during a bank maneuver if the turn is not perfectly coordinated. The amount of miscoordination will be sensed by block 76 which then will add this mis-coordination term to block 78 resulting in a composite slaving signal derived from both block 76 and block 80.

The details of the roll angle estimation are as explained below.

Roll Angle Estimation

In normal flight operations, pilots turn the aircraft by executing a roll to a bank angle, then a coordinated turn holding a constant bank angle, followed by a roll in the opposite direction to exit from the turn.

The lateral force for such a maneuver equation may be written generally as:

$$Y + mg \cos \Theta \sin \Phi = m(\dot{v} + ru + pw) \quad (1)$$

Certain simplifying assumptions can be made for other than high performance aircraft operating at subsonic speeds where compressibility is not a factor. Specifically:

$Y = 0$ (no side force) (2)

$\Theta \approx 0 \Rightarrow \cos\Theta \approx 1$ (small pitch angle)

$\dot{v} = 0$ (no sideslip)

$w = 0$ (constant altitude, small angle of attack)

$\sin\Phi \approx \Phi$ (small roll angle)

Substituting these simplifying assumptions (2) for the steady state coordinated banked turn into the lateral force equation (1) reduces to:

$$\hat{\Phi} = \frac{r \cdot u}{g} \quad (3)$$

Equation (3) shows that for a coordinated turn, Euler roll angle can be established by multiplying body axis yaw rate with true airspeed, u, and dividing by the gravity constant. The body axis yaw rate, r, is sensed by a yaw rate gyro which is a component of an AHRS system, but optimally could come from an independent sensor. True airspeed, u, is derived from an on board air data computer or true airspeed computer. Indicated airspeed may also be used but will be less accurate for altitudes other than sea level.

Figure 10:
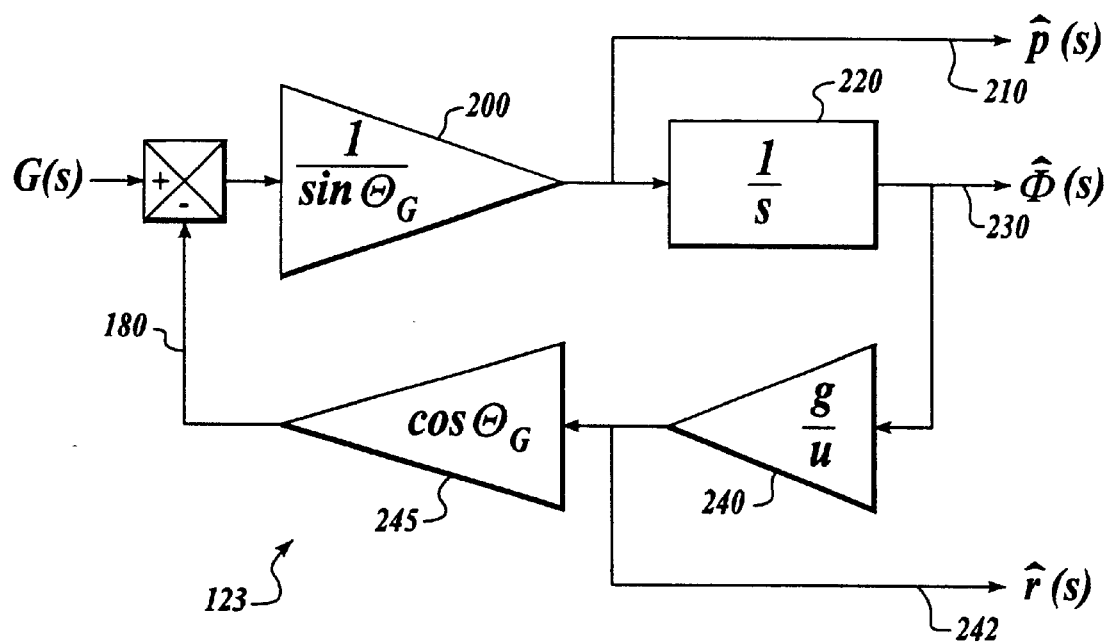
FIG. 10 is a block diagram of a roll angle estimator according to a preferred embodiment of the invention.
Figure 11:
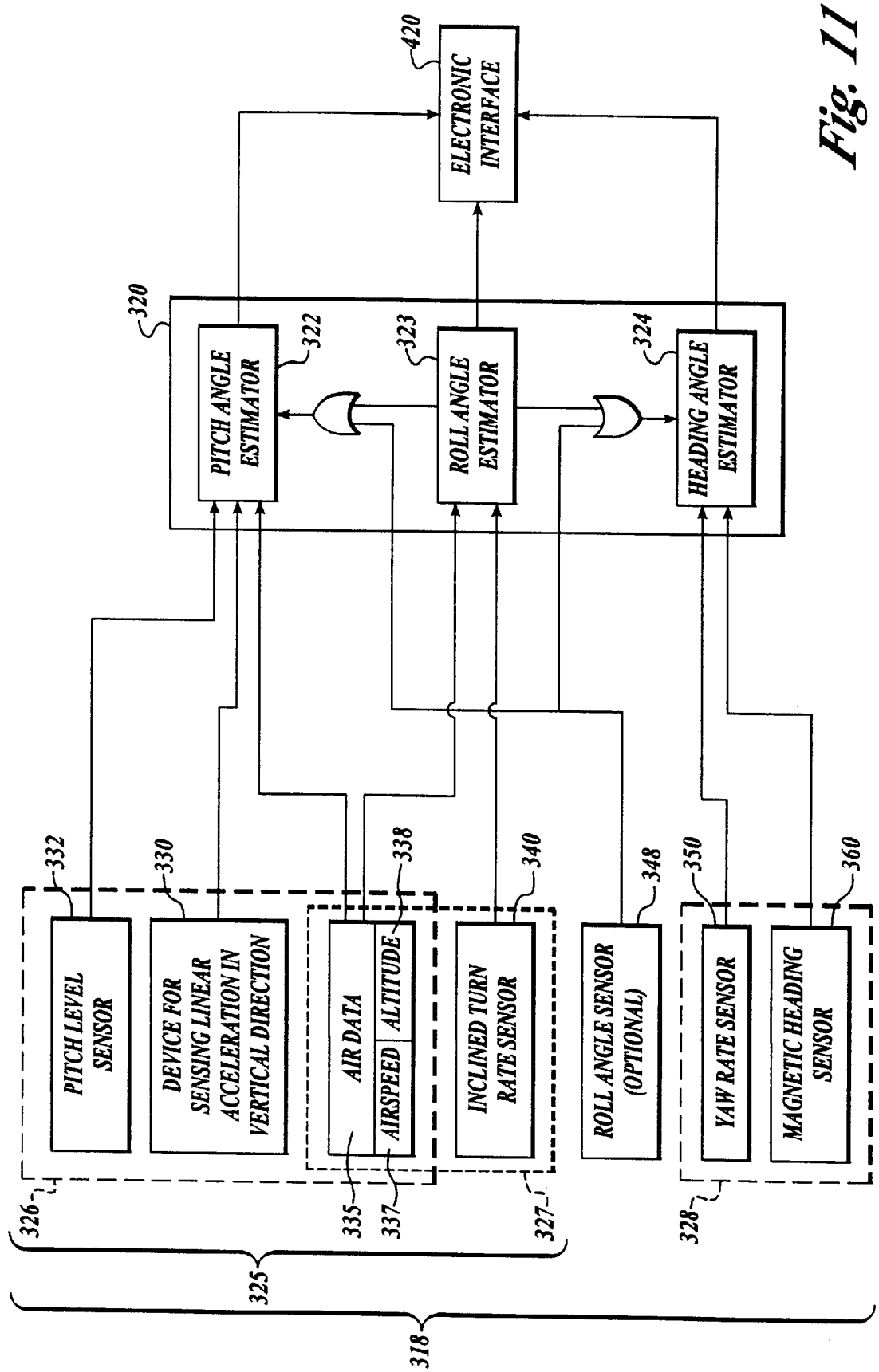
FIG. 11 is a block diagram of a system for estimating roll, pitch and heading angles according to a preferred embodiment of the present invention.

FIGS. 10 and 11 illustrate an alternative embodiment of the invention in which the Euler roll angle signal output from block 80, is supplied from an auxiliary system normally used to estimate aircraft attitude in the event of full or partial failure of the aircraft primary attitude system or the AHRS. Such a system is fully described in Applicant's copending application Ser. No. 09/746,316, filed Dec. 22, 2000, entitled "Method Apparatus and Computer Program Product for Estimating Aircraft Attitude with Reduced Sensor Set, which is herein incorporated by reference for all purposes.

The system of FIG. 10 can be used, for example, as a back up input for block 80 of FIG. 9 when the yaw rate gyro has failed or is unavailable, or in lieu of the embodiment of block 80 described in the previous paragraph. This construction has the advantage of utilizing a previously installed system to obtain $\hat{\Phi}$ when, for example, the auxiliary system of FIG. 11 is already installed aboard the aircraft. However, since the output $\hat{\Phi}$ of FIG. 10 is based on a reduced set of aircraft attitude sensors, such a system provides a less accurate slaving input to the system of FIG. 9 than does the previously described embodiment.

FIG. 11 is a system level block diagram useful for understanding implementation of an auxiliary system for estimating airplane attitude with a reduced sensor set. In the embodiment of FIG. 11, a signal processing device 320 is employed to process data signals received from sensors 318 to obtain the desired angle estimates. Signal processing device 320 may comprise an analog circuit, a microprocessor, a digital logic circuit, executable code or any combination thereof. In a preferred embodiment of the invention, device 320 comprises a pitch angle estimator 322, a roll angle estimator 323 and a heading angle estimator 324.

Sensor suite 318 may be logically subdivided into two categories, delineated in FIG. 11 by reference numerals 325 and 328. Sensors contained within logical grouping 325 provide those inputs to device 320 useful for obtaining pitch angle and roll angle estimates and may be therefore further subdivided into logical groupings 326 and 327 respectively. These sensors include a device 330 for sensing linear acceleration in the vertical direction and an optional pitch level sensor 332. In one preferred embodiment of the invention both device 330 and sensor 332 comprise single axis accelerometers which may be housed as a single component. Also included in sensor suite 325 is a source of air data 335 which supplies airspeed information 337 and/or altimetry data 338. Air data sensor 335 preferably comprises the aircraft air data computer.

Also included in sensor suite 325 is an inclined turn rate sensor 340, such that it will sense a component of both yaw rate and roll rate. According to one embodiment of the present invention sensor 340 is a turn coordinator. The !output of sensor 340 in conjunction with sensor 335 is used by roll angle estimator 323 to obtain a roll angle estimate. The roll angle estimate output by estimator 323 also may also serve as input to pitch angle estimator 322 and/or heading angle estimator 324 in the event of roll angle gyro system failure. If the aircraft primary roll rate sensor remains operative, the input from roll angle gyro 348 may be used as input to estimators 322 and 324 in lieu of using the roll angle estimator 323 output. As described above, roll angle estimator 323 may also provide input to slave the roll angle gyro during turns exceeding a predetermined bank angle. In this manner, the gyro can continue to receive error corrections during such turns. In a preferred embodiment of the invention, roll angle estimator 323 is constructed according to the block diagram of FIG. 10.

Sensor suite 328 comprises those sensors used by heading angle estimator 324 to obtain a heading angle estimate. Sensor suite 328 includes a yaw rate sensor 350 and a magnetic heading sensor 360. In a preferred embodiment of the invention, yaw rate sensor 350 comprises a yaw rate gyro, while magnetic heading sensor 360 is preferably a flux gate. Heading angle estimator 324 also receives a roll angle input from estimator 323 or roll angle sensor 348 in the manner previously described. In one possible embodiment of the invention, yaw rate sensor 350 may also be used to supply the yaw rate component of block 80 in FIG. 9.

The pitch angle, roll angle and/or heading angle estimates output by signal processor 320 are output to an electronic interface 420. Electronic interface 420 may be an electronic cockpit display for displaying the angle information directly to the pilot. Optionally, electronic interface 420 may comprise an intermediary device for converting the signals output by signal processing device 320 into a data format used by the aircraft avionics data bus for later display on a separate electronic cockpit display (not shown); for use by other avionics systems requiring such data; or to convert the electronic signals to a form useful for driving aircraft mechanical cockpit indicators.

Therefore, as illustrated above utilizing the teachings of the present invention, the roll angle output from systems incorporating the present invention has improved accuracy for all bank angles. The roll angle calculation circuit can now continue to operate to provide roll angle data even during periods when the gyro is no longer supplying data or has entered free drift mode. Thus, the present invention results in improved safety, navigational accuracy and improved autopilot operation.

The preferred embodiments of the invention have been described. Variations and modifications will be readily apparent to those of ordinary skill in the art. For example, the invention is not limited to the specific mechanizations shown. The invention is therefore to be interpreted in light of the claims.

What is claimed is:

1. A method for improving the accuracy of roll angle gyro operations comprising the steps of:

detecting when the roll angle gyro has exceeded a predefined roll angle;

supplying, during a period when said roll angle gyro exceeds said predefined roll angle, a roll angle estimate data from a source other than a roll angle gyro; and providing said roll angle estimate data to a roll angle error correction device.

2. The method of claim 1 wherein said step of supplying a roll angle estimate further comprises the steps of:

measuring an airspeed;

measuring a yaw rate; and estimating roll angle as a function of said airspeed, said yaw rate and acceleration due to gravity.

3. An Aircraft Attitude Reference System (AHRS) comprising:

a means for obtaining an Euler roll angle; and an error correction device, coupled to said means for obtaining an Euler roll angle, for supplying an estimated roll angle as a function of airspeed, yaw rate and acceleration due to gravity, to said means during a period when said Euler roll angle exceeds a predefined limit.

4. The AHRS of claim 3 wherein said means for obtaining an Euler roll angle comprises a feedback control loop.

5. The AHRS of claim 4 wherein said means for obtaining an Euler roll angle further comprises a roll rate gyro.

6. The AHRS of claim 3 wherein said error correction device comprises a feedback control loop.

7. The AHRS of claim 3 wherein said error correction device further comprises a roll level sensor.

8. A system for roll angle information comprising:

a roll rate sensor;

a first device, coupled to said roll rate sensor, for obtaining an Euler roll angle;

a first error correction device, coupled to said first device, for correcting errors in said Euler roll angle; and a roll angle estimator, coupled to said first error correction device, for supplying a roll angle estimate to said first error correction device, during a period of time when said Euler roll angle exceeds a predefined limit.

9. The system of claim 8 wherein said roll angle estimator further comprises:

an airspeed sensor;

a yaw rate sensor; and a roll estimate device for obtaining a roll estimate as a function of said airspeed and said yaw rate and acceleration due to gravity.

10. The system of claim 9 wherein said roll angle estimator forms part of an apparatus used to estimate heading angles, roll angles and pitch angles.

11. The system of claim 10 wherein said predefined limit is six degrees.

12. A computer program product for limiting roll angle drift errors comprising:

a computer readable storage medium having computer readable program code means embodied in said medium, said computer-readable program code means having:

first computer instruction means for accessing an aircraft airspeed and a yaw rate data;

a second computer instruction means for estimating aircraft roll angle as a function of said aircraft airspeed and yaw angle rate data; and a third computer instruction means for correcting said roll angle data, during turns exceeding a predefined bank angle, according to an estimated roll angle output from second computer instruction means.

* * * * *